United States Patent
Johnson (10) Patent No.: US 6,390,169 B1
(45) Date of Patent: May 21, 2002

(54) CONFORMABLE COMPACTION APPARATUS FOR USE WITH A FIBER PLACEMENT MACHINE

(75) Inventor: Brice Aaron Johnson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/510,783

(22) Filed: Feb. 23, 2000

(51) Int. Cl.$^7$ .............................................. B32B 31/00
(52) U.S. Cl. ........................ 156/523; 156/574; 156/577
(58) Field of Search ................................ 156/523, 574, 156/577

(56) References Cited

U.S. PATENT DOCUMENTS

| | | |
|---|---|---|
| 4,954,204 A | 9/1990 | Grimshaw |
| 4,997,510 A | 3/1991 | Shinno et al. |
| 5,011,563 A | 4/1991 | Shinno et al. |
| 5,015,326 A | 5/1991 | Frank |
| 5,022,952 A | 6/1991 | Vaniglia |
| 5,110,395 A | 5/1992 | Vaniglia |
| 5,314,563 A | 5/1994 | Grimshaw et al. |
| 5,316,612 A | 5/1994 | Peterson et al. |
| 5,454,897 A | 10/1995 | Vaniglia |
| 5,738,749 A | 4/1998 | Grimshaw et al. |
| 5,766,357 A | 6/1998 | Packer et al. |
| 5,792,308 A | 8/1998 | Ryan et al. |

*Primary Examiner*—Michael W. Ball
*Assistant Examiner*—Todd J. Kilkenny
(74) *Attorney, Agent, or Firm*—Harness Dickey & Pierce P.L.C.

(57) ABSTRACT

A conformal compaction roller for a fiber placement machine. The compaction roller includes a plurality of independent roller segments which are disposed for eccentric, pivoting movement about a common pivot shaft. Each roller segment includes a roller segment plate having an arcuate slot formed therein. A strong back member is disposed within the slot to limit pivoting movement in fore and aft directions. A pair of expandable bladders are disposed within the arcuate bore adjacent the strong back member. The bladders urge the roller segment plates pivotally in the fore direction to provide a generally uniform pressure against a complexly shaped tool surface of the fiber placement machine. The principal advantage of the compaction roller is the eccentric, independent, pivoting movement of each of the roller segments which allows the compaction roller to be used with fiber placement machines having very limited space within which the compaction roller must operate without interfering with adjacently disposed components of the machine. The compaction roller of the present invention is capable of being used in applications where space is too limited for compaction rollers having linearly displaceable segments. The pivoting roller segments also are capable of providing increased stroke lengths over compaction rollers having linearly translatable roller segments.

13 Claims, 7 Drawing Sheets

CONFORMABLE COMPACTION APPARATUS FOR USE WITH A FIBER PLACEMENT MACHINE

TECHNICAL FIELD

This invention relates to compaction devices for fiber placement machines, and more particularly to a multi-segment, curvilinearly conformal compaction roller for a fiber placement machine which is capable of applying a generally uniform pressure against a complexly shaped tool mounted in the machine, and wherein its independent segments can move laterally slightly in a manner which does not interfere with other components of the machine disposed closely adjacent the roller during operation of the machine.

BACKGROUND OF THE INVENTION

Fiber placement machines typically employ a compaction device (i.e., a compaction "head") to compact a band of uncured epoxy impregnated composite towpreg onto a tool surface mounted in the machine. A conformal roller is required to provide adequate compaction pressure across the entire width of the material as the material is drawn over a tool having a contoured (i.e., complexly) shaped surface.

The problem with present day fiber placement machines and the conformal rollers typically used therewith is that the roller must be able to conform to the tool surface. Poor compaction allows the material to pull away from the tool and therefore require costly and time consuming hand repairs to be made. Accordingly, some form of conformal roller is required to compact the band of material over a complexly shaped tool surface of the fiber placement machine, thus ensuring even compaction forces across the width of the material being fed through the machine.

Figure 1:
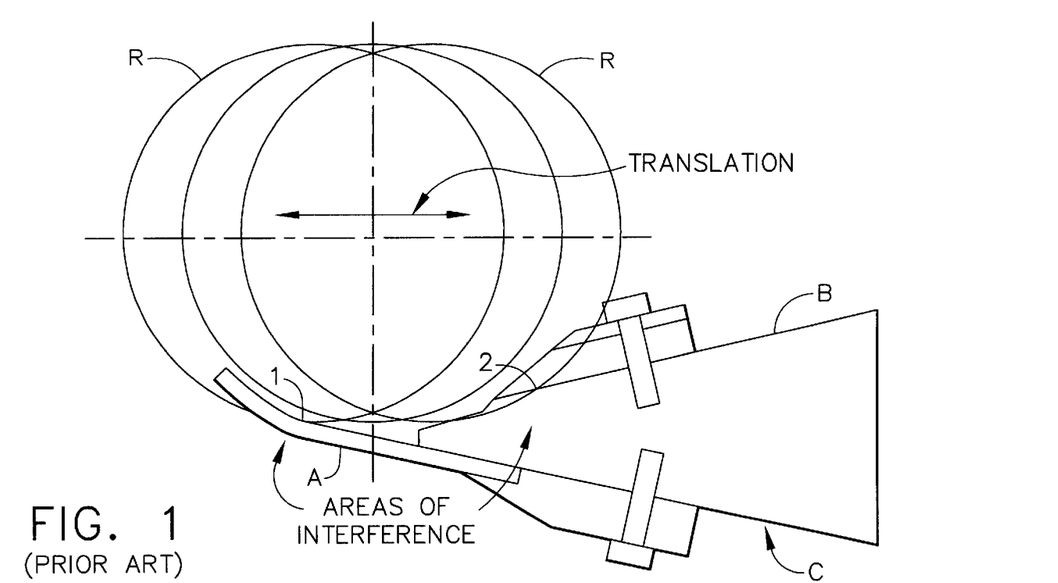
FIG. 1 is a diagram of a prior art compaction roller being translated linearly horizontally, illustrating the interference that results at two areas of a tool surface of a fiber placement machine as a result of the linearly translating movement of the compaction roller.

The problem with implementing the use of a conformal roller in many forms of fiber placement machines is the very limited space available in the area of the machine where the roller is to be supported. More often, these severe geometric constraints severely limit how the roller can conform without interfering with other components of the machine disposed closely adjacent the roller. FIG. 1 illustrates this problem if the entire roller is moved linearly to conform to a complexly shaped tool surface. In FIG. 1 it will be noted that the roller R interferes at points 1 and 2 with components A and B of a fiber placement machine C. With some types of fiber placement machines, implementation of a roller design incorporating linearly translating segments, such as shown in FIG. 1, would result in the segments colliding with other head components of the machine. This can prevent the full conformance required to maintain even compaction force over complex contours of he tool, thus causing damage to fragile lay-ups such as sandwich lay-ups. It can also result in potential jamming of the roller segments causing them to slide along the surface of the material being compacted, thus causing damage to the outer segment surface and lay-up.

Various attempts have been made to develop conformal rollers using internal pressure bladders. Two such attempts are disclosed in U.S. Pat. Nos. 4,052,246 and 4,341,584. Fiber placement specific conformal devices incorporating internal bladders and linearly translating roller segments were also disclosed in U.S. Pat. Nos. 5,454,897 and 5,110,395. The teachings of these four patents are expressly incorporated by reference herein. While the conformal devices disclosed in these patents may be acceptable in some applications and with certain types of fiber placement machines, these devices are still limited by the additional space required by the linearly translating roller segments of each, which space is not always available with every make of fiber placement machine.

It is therefore a principal object of the present invention to provide a conformal compaction roller for use with a fiber placement machine which does not require the additional space needed by linearly translating roller segments, and which can therefore be used with fiber placement machines having a very limited space envelope within which the compaction roller must operate.

It is still another object of the present invention to provide a conformal compactional roller for a fiber placement machine that does not require modification to standard components of the fiber placement machine, and which can therefore be installed on an existing fiber placement machine without otherwise affecting operation of other components of the machine.

It is still another object of the present invention to provide a conformal compaction roller for a fiber placement machine which can operate within a much smaller space envelope than linearly translatable roller devices, and which still applies a generally uniform pressure across a complexly shaped tool surface of the machine.

It is still another object of the present invention to provide a compaction roller capable of providing a longer stroke length for a given diameter compaction roller than a compaction roller having linearly translating roller segments.

SUMMARY OF THE INVENTION

The above and other objects are provided by a conformal compaction roller in accordance with preferred embodiments of the present invention. The compaction roller is adapted for use with fiber placement machines having a small space envelope within which the roller must operate, and which envelope would not permit the use of linearly translatable compaction rollers. The compaction roller of the present invention thus can be used in those fiber placement machines where a linearly translatable compaction roller could not be installed because of interference that would result from other components of the machine disposed closely adjacent to the compaction roller.

The compaction roller of the present invention generally comprises a plurality of roller segments disposed in a side-by-side relationship, and each being supported for pivotable movement about an eccentrically disposed pivot shaft. Each roller segment further includes an arcuate shaped cutout. Collectively, the cutouts of the roller segments form an arcuate bore. Disposed within the arcuate bore is a strong back member which is supported by a pair of end plates. The end plates are in turn operatively supported by portions of the fiber placement machine with which the compaction roller is being used.

Also disposed within the arcuate bore is at least one bladder having a length that is sufficient to extend through each of the roller segments. The bladder is disposed against the strong back member and, when inflated with air or another fluid medium, causes the roller segments to be urged pivotally about the eccentrically disposed pivot shaft against the tool surface which is mounted in the fiber placement machine. Since the roller segments do not translate linearly, each roller segment is able to move slightly to conform to the complexly shaped tool surface without impinging other components of the machine disposed closely adjacent to the compaction roller.

Each roller segment further includes a bearing assembly disposed on an outer perimeter thereof. A tire is in turn disposed on the outer race of each bearing assembly of each roller segment. In one preferred form, each tire comprises an elastomeric member. The bearing assemblies enable the tire of each roller segment to move rotationally relative to its associated roller segment.

The independent, eccentric, pivoting movement of each roller segment thus enables each of the segments to conform to a complexly shaped tool surface without moving so much as to cause interference with other components of the fiber placement machine that are disposed very close to the compaction roller. This pivoting movement also allows sufficient conformance to provide uniform compaction pressures across the entire compaction roller. The compaction roller of the present invention can thus be used with fiber placement machines where the use of a compaction roller having linearly translating roller segments would not be possible because of interference of the roller segments with other components of the fiber placement machine disposed close to the compaction roller.

The compaction roller of the present invention further does not require significant modification of the fiber placement machine. As such, the compaction roller of the present invention can be retrofitted on a fiber placement machine to thus allow operation in connection with various complexly shaped tool surfaces, where such operation would not be possible with linearly translatable compaction rollers.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 2:
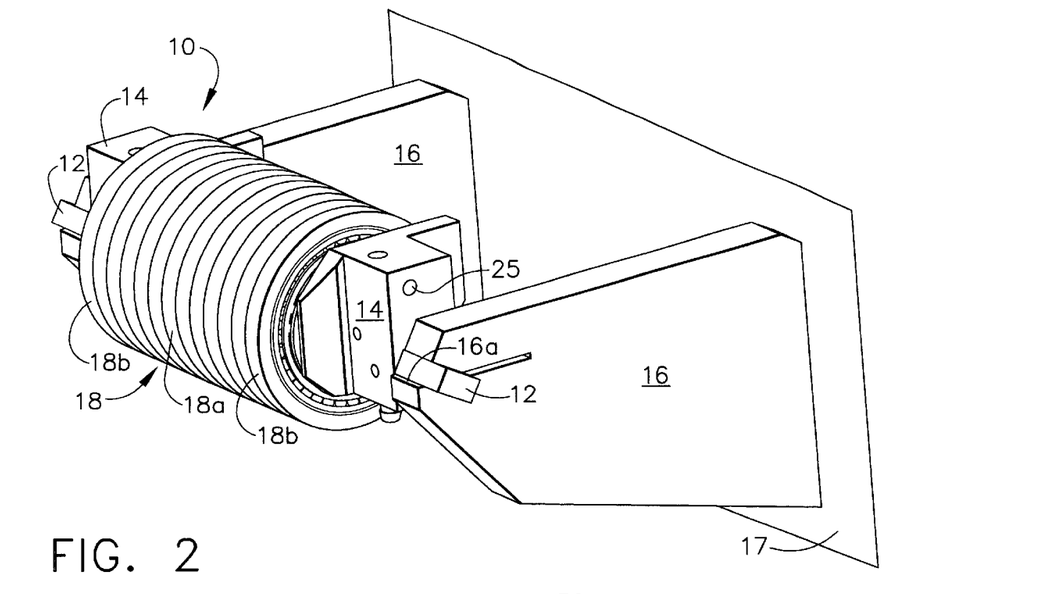
FIG. 2 is a perspective view of a conformal compaction roller in accordance with a preferred embodiment of the present invention.

Referring to FIG. 2, there is shown a conformal compaction roller 10 in accordance with a preferred embodiment of the present invention. The compaction roller 10 is adapted to be used with a wide variety of fiber placement machines, but at the present time is particularly well adapted to be used with certain models of fiber placement machines manufactured by the Ingersoll Milling Machine Co. It will be understood, however, that the compaction roller 10 could be used with little or no modification with various other fiber placement machines where the space envelope within which the compaction roller must operate is very limited, thus making the use of linearly translatable compaction rollers impossible.

Referring further to FIG. 2, the compaction roller 10 of the present invention is supported by a pair of axle mounts 14 having arm portions 12, which engage with slots 16a formed in a pair of support arms 16. The support arms 16 form a portion of a fiber placement machine 17. The compaction roller 10 is further disposed so as to provide pressure against a complexly shaped tool surface, such as the tool surfaces shown in FIGS. 11 and 12. The compaction roller 10 includes a plurality of independent, circular roller segments 18 disposed in side-by-side relationship. The roller segments 18 are movable independently of one another such that the compaction roller 10 can conform to complexly shaped tool surfaces and apply a uniform pressure against the entire surface of such tools to better compact material being drawn through the fiber placement machine 17.

Figure 3:
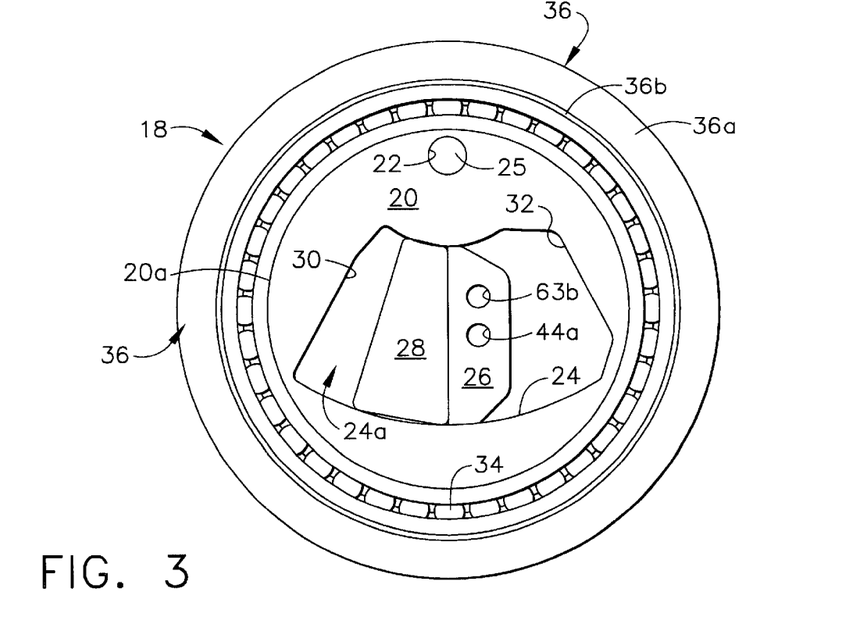
FIG. 3 is a side view of the compaction roller of FIG. 2 with the axle mount and retainer plate removed.

Referring to FIG. 3, each roller segment 18 includes a roller segment plate 20 having an eccentrically disposed pivot aperture 22 and an arcuate shaped cutout 24 centered about the pivot aperture 22. A pivot shaft 25 extends through the pivot aperture 22 in each roller segment plate 20 such that each roller segment 18 can pivot eccentrically about the pivot shaft 25.

The arcuate shaped cutouts 24 collectively form an arcuate bore 24a within which is disposed a strong back member 26 and a pair of expandable bladders 28 (only one being visible in FIG. 3). The strong back member 26 is a rigid piece of material such as steel or aluminum having a length sufficient to extend through each of the roller segments 18. Similarly, the bladders 28 have a combined length sufficient to extend substantially through each of the roller segments 18. Each arcuate shaped cutout 24 has a fore end 30 and an aft end 32 which limit fore and aft pivoting movement of the roller segment plate 20 within predetermined limits. The roller segment plate 20 may be formed from a wide variety of materials, but in one preferred form is preferably comprised of steel or aluminum. Other suitably strong materials may be used.

With further reference to FIG. 3, disposed on an outer perimeter 20a of each roller segment plate 20 is a bearing assembly 34. In one preferred form, the bearing assembly comprises a ball bearing assembly. A tire assembly 36 is carried on an outer race of the ball bearing assembly 34 and can thus move independently of the roller segment plate 20. In one preferred form the tire assembly 36 comprises an elastomeric tire member 36a disposed on a metal ring 36b. The tire member 36a further preferably includes a thin coating (preferably about 0.010 inch thick; 0.254 mm) of low stick or low friction material, such as FEP (fluorinated ethylene propylene). The elastomeric tire member 36a preferably is disposed on a metal ring 36b which is press fit onto the outer race of the bearing assembly 34. In this manner the tire assembly 36 can be replaced as needed without having to replace the bearing assembly 34.

In the preferred embodiment shown in FIG. 2, a centermost one of the roller segments 18, designated roller segment 18a is not disposed pivotally, but rather fixedly, relative to the pivot shaft 25. Thus, while each of the other roller segments 18 are free to move in a pivotally eccentric manner about the pivot shaft 25, roller segment 18a remains fixed against pivotal movement. This allows a reference to be established by which the roller 10 can be controlled during operation.

Figure 4:
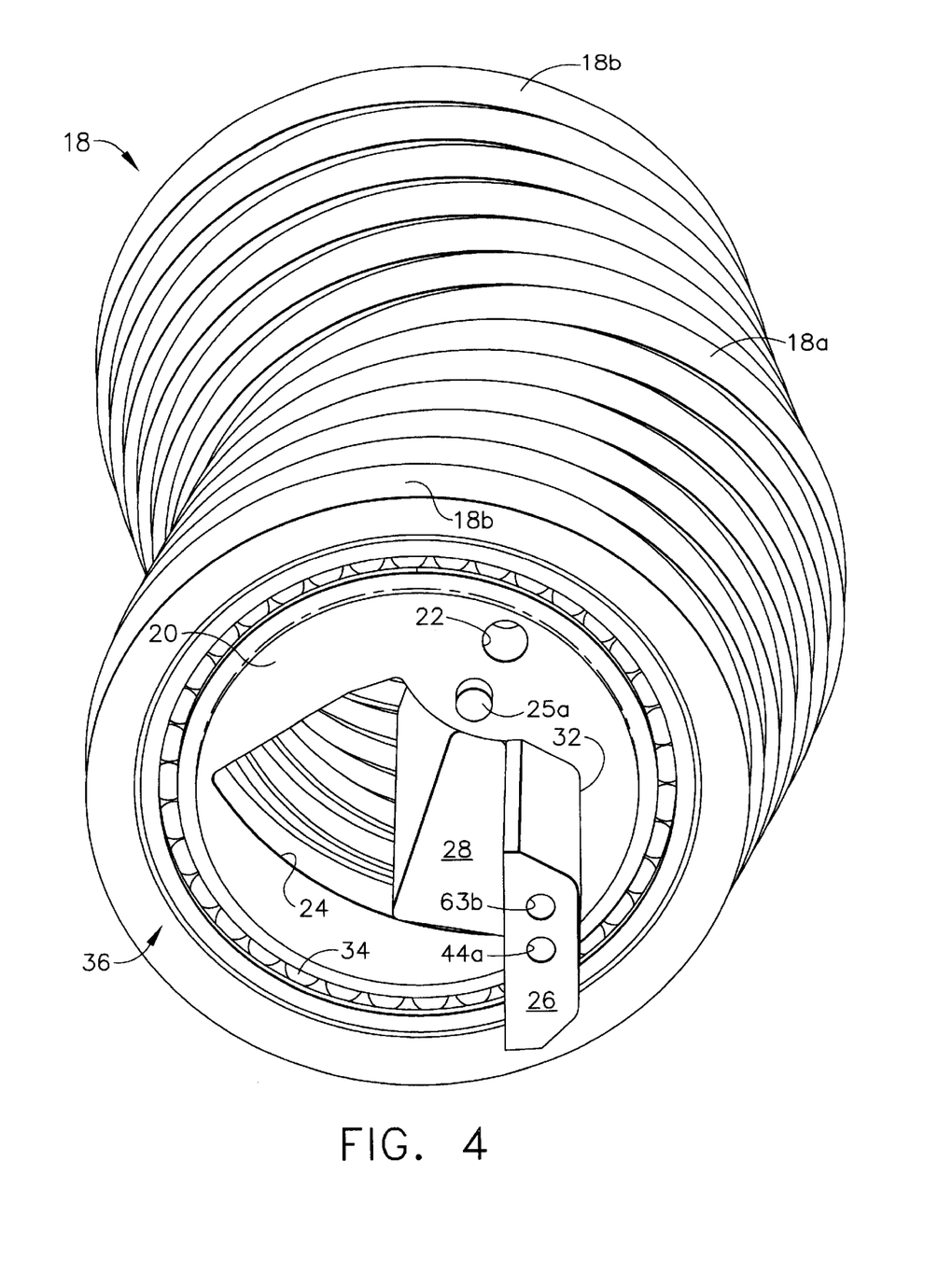
FIG. 4 is a perspective view of the compaction roller without the axle mounts, illustrating how the roller segments can move independently of one another to conform to a complexly shaped surface.

With reference to FIG. 4, one of the bladders 28 is shown in its unexpanded condition. It can be seen that the bladder 28 has one surface which rests against the strong back member 26. The strong back member 26 is further shown abutting the aft edge 32 of the arcuate slot 24 of an endmost one of the roller segments 18b, thus limiting movement of the of each of the roller segments 18 in the fore (i.e., to the left) direction. The bladders 28 can be expanded by pressurized air or virtually any other suitable pressurized fluid. Each endmost roller segment 18b is identical in construction to the other roller segments 18 except that these segments each include an outwardly projecting pin 25a below the pivot aperture 22. The function of these pins 25a will be described momentarily.

Figure 5:
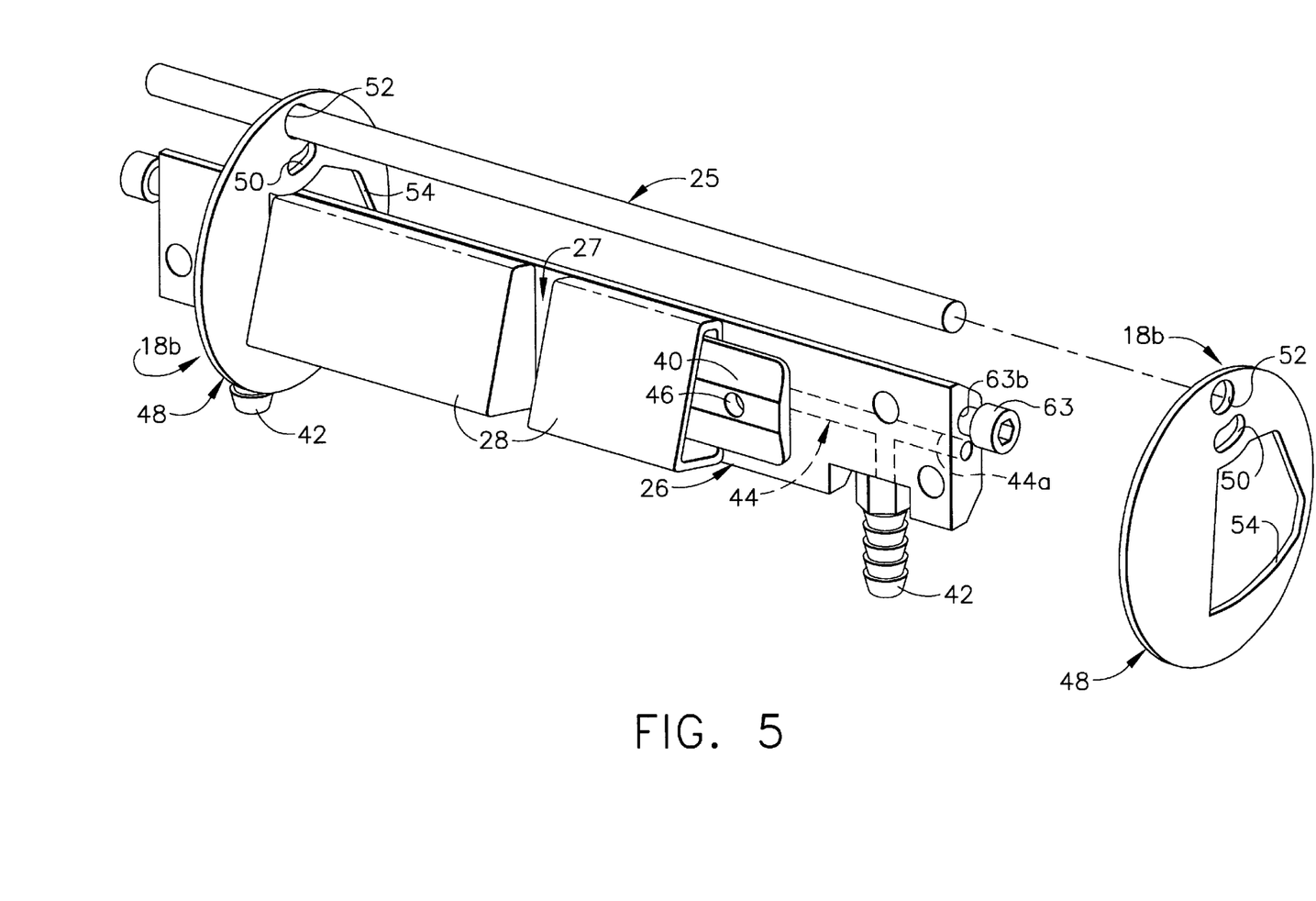
FIG. 5 is an exploded perspective view of the strong back member, the retainer plates, the pair of bladders (one shown in cutaway) and the pivot shaft, but omitting the roller segments.

With reference to FIG. 5, the construction of the strong back member 26 and the bladders 28 can be seen in greater detail, with one of the bladders 28 shown in cutaway. The strong back member 26 supports the bladders 28 thereon by separate retainer bars 40 (only one being visible) which are each secured, such as by threaded members 78 (shown in FIG. 6), to the strong back member 26. The bladders 28 are spaced apart to form a slot 27 where the fixed roller segment 18a (shown in FIG. 2) is disposed. The strong back member 26 also includes barbs 42 which communicate air or any other suitable fluid through internal passageways 44 (only one being designated), through an associated one of the retainer bars 40, and into the interior of an associated one of the bladders 28 through an opening 46 in the retainer bar 40. In this manner both bladders 28 can be inflated simultaneously as needed. Portion 44a of the passageway 44 is needed to create the passageway 44 during manufacture of the strong back member 26, but is thereafter plugged to prevent leakage of the fluid medium.

FIG. 5 also illustrates a pair of retainer plates 48 which are adapted to be disposed against the outwardly facing surfaces of the segment plates 20 of the endmost roller segments 18b. The retainer plates 48 are formed from a suitably rigid material such as steel or aluminum. Each retainer plate 48 includes a small arcuate slot 50 formed directly below a pivot aperture 52. From FIGS. 5 and 7–9, it can be seen that this slot 50 is formed so as to permit engagement of the pin 25a of the endmost roller segment 18b positioned against it within the slot 50. This permits the endmost roller segment 18b to pull the retainer plate 48 in the fore direction (i.e., to the left as shown in FIG. 7) when the roller segments 18 and 18b are urged (i.e., "stroke") in the fore direction.

It will also be noted that the retainer plates 48 each include an arcuate cutout 54 which is smaller than the arcuate shaped cutout 24. The cutout 54 (FIGS. 7–9) essentially is about one-half the area of the cutout 24, and more specifically forms essentially only the rightmost half of the arcuate shaped cutout 24 of the other roller segments 18. This allows the retainer plates 48 to maintain the roller segments 18b spaced slightly apart from the axle mounts 14, while still allowing the retainer plates 48 to move in the fore direction (shown in FIG. 7). The cutouts 54, however, prevent the retainer plates 48 from being urged beyond the central position shown in FIG. 8 as the roller segments 18 and 18b are urged in the aft direction (i.e., stroke to the right in FIG. 9).

Figure 7:
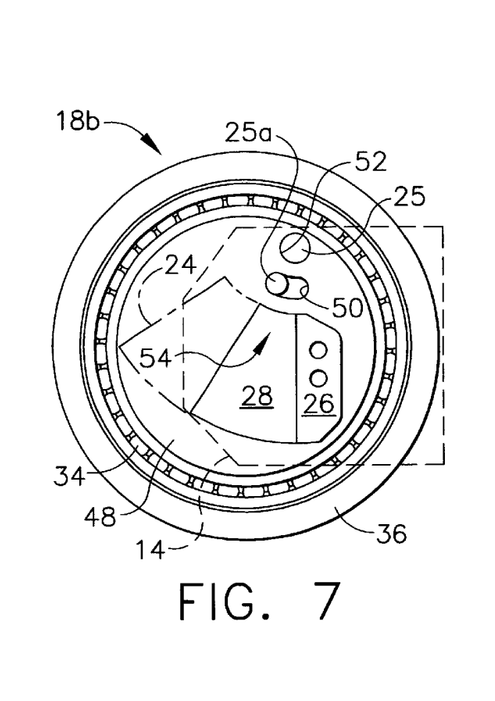
FIGS. 7–9 are side views of one end of the compaction roller, with the axle mounts omitted, illustrating how the retainer plate on one end rotates within a predetermined, limited arc to prevent exposure of the forward edge of the bladder when the roller segments are urged forwardly to a maximum degree, and also illustrating how the retainer plate is limited from stroking in the aft direction.
Figure 8:
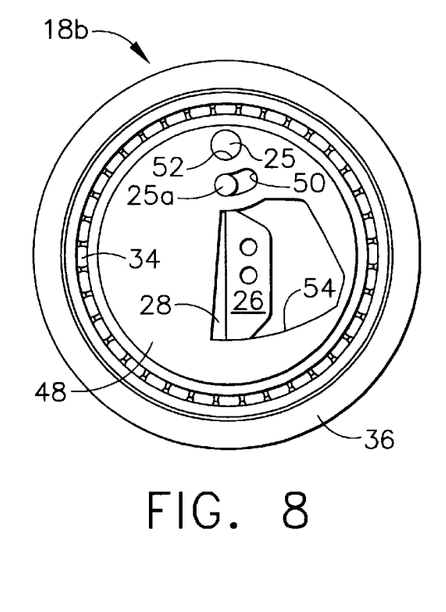
Figure 9:
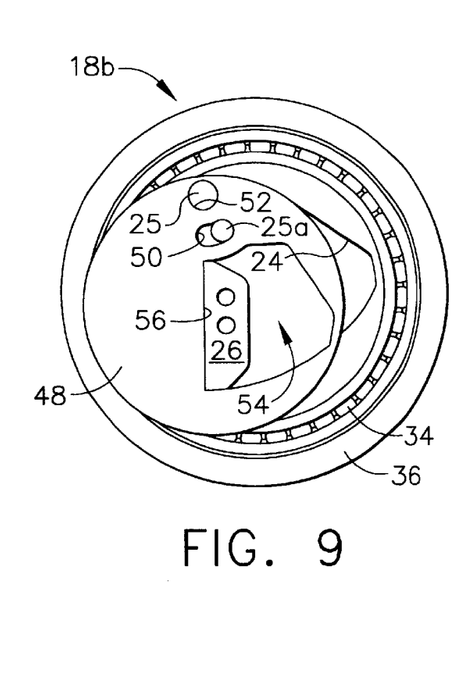

It is a principal advantage of the retainer plates 48 that they cover each of the bladders 28, and thus prevent each of the bladders 28 from being exposed when the roller segments 18 and 18b are urged in the fore direction to the maximum degree (i.e., such as shown in FIG. 7). This is illustrated by the depiction of the axle mount 14 in dashed lines in FIG. 7. Even when the endmost roller segment 18b urges the retainer plate 48 into a position of maximum fore travel, the cutout 54 is not so large that it opens beyond the area of the axle mount 14, and thus does not allow the portion of the bladder 28 extending beyond the axle mount 14 to be exposed. Maximum movement in the aft direction (FIG. 9) is limited by contact of the strong back member 26 with the fore edge 56 of the cutout 54.

Figure 6:
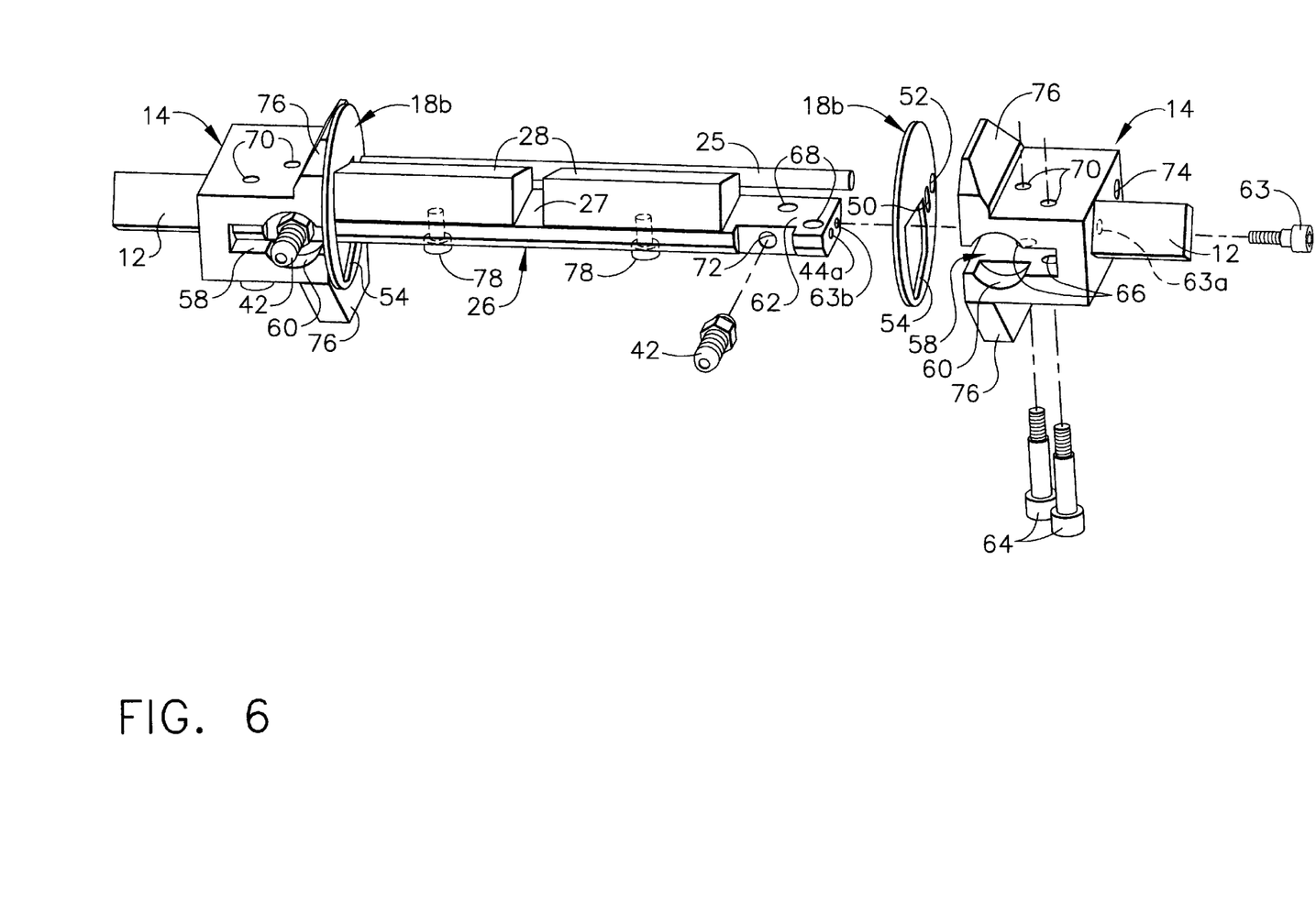
FIG. 6 is an exploded perspective view of the strong back member and the axle mounts, together with the retainer plates and pivot shaft.

Referring to FIGS. 5 and 6, the attachment of the strong back member 26 to the axle mounts 14 is illustrated. The axle mounts 14 (FIG. 6) each include a slot 58 having an enlarged opening 60. The slot 58 receives an end portion 62 of the strong back member 26. The end portion 62 is secured to the axle mount 14 by suitable fasteners, such as threaded fasteners 64, which extend through bores 66, through openings 68 in the end portion 62, and through bores 70 in the axle mount 14. A threaded fastener 63 extends through a bore 63a in the axle mount 14, and into a threaded bore 63b (FIG. 5) in the strong back member 26. This helps hold the axle mount 14 to the strong back member 26 and provide proper spacing between the axle mount 14 and the strong back member 26. The enlarged openings 60 permit barbs 42 to be threadably engaged into openings 72, where the openings 72 each form one end of each of the air passageways 44 (shown in FIG. 5). The retainer plates 48 are held on the strong back member 26 by contact with flange portions 76 of the axle mounts 14. A bore 74 receives an end portion of the pivot shaft 25 therein. Threaded members 78 engage with threaded openings (not shown) in the retainer bars 40 to hold the retainer bars to the strong back member 26.

Figure 10:
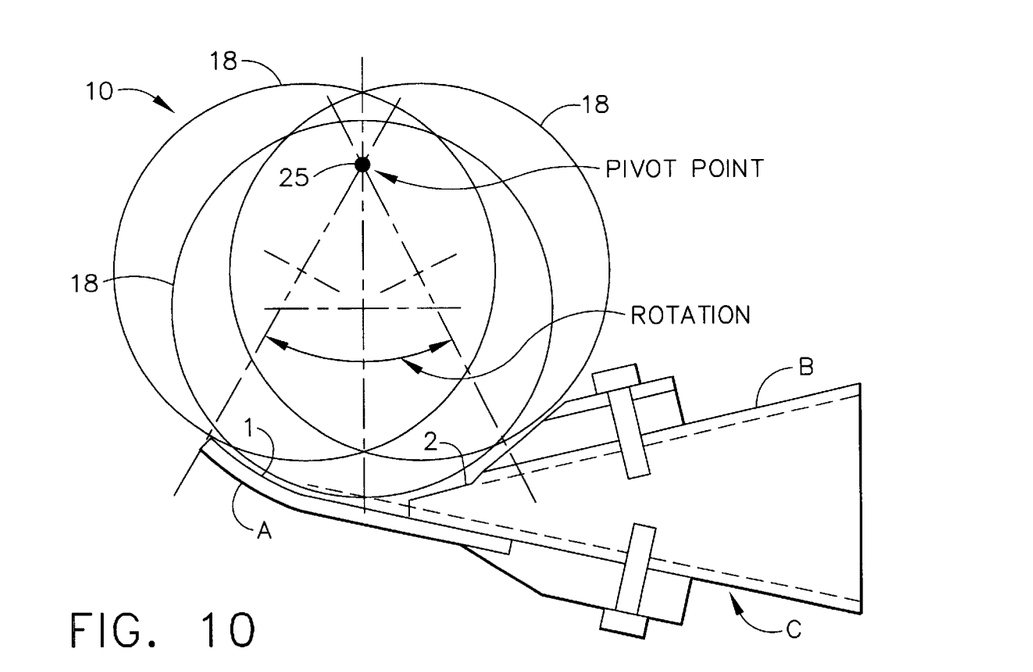
FIG. 10 is a diagrammatic view illustrating how the compaction roller of FIG. 4, by the roller segments pivoting eccentrically about the pivot shaft, can be moved so as to avoid interfering with portions of a fiber placement machine.

FIG. 10 illustrates how the compaction roller 10 of the present invention avoids interfering with areas A and B of the fiber placement machine as a result of the pivoting movement of each of the roller segments 18. Since the roller segments 18 are able to pivot eccentrically about a common pivot point (i.e., about pivot shaft 25), the interference that would result from simple translational linear movement of the segments 18 is avoided. Thus, the compaction roller 10 can be used with those fiber placement machines having an extremely limited space envelope within which the roller 10 must operate without interfering with various other components disposed adjacent to the roller 10.

Figure 11:
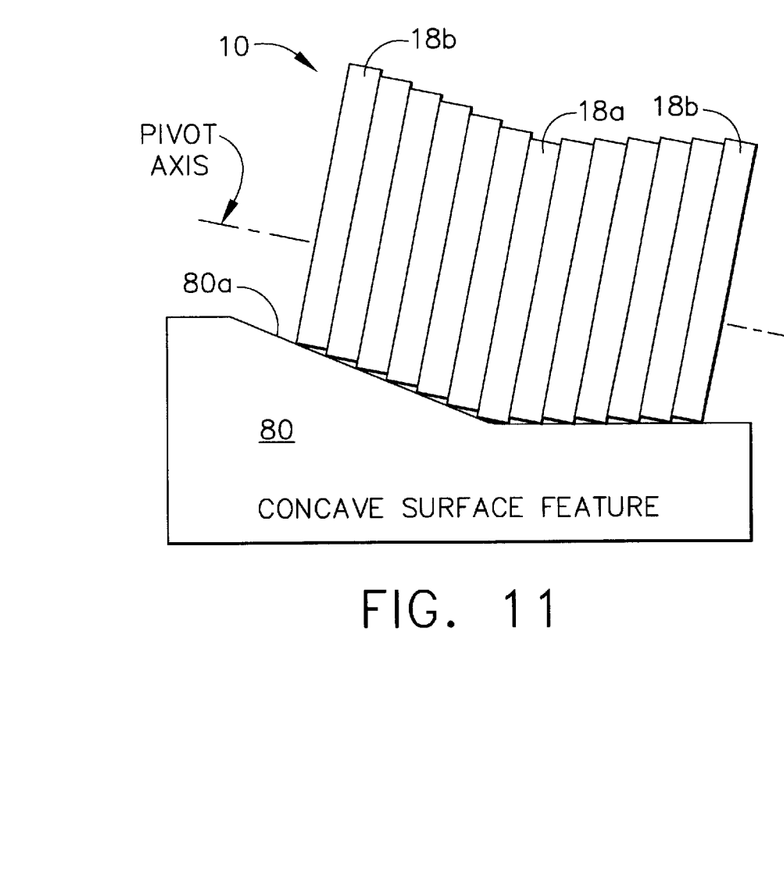
FIG. 11 is a view of the compaction roller of FIG. 4 illustrating the roller conforming to a concave surface of a tool.
Figure 12:
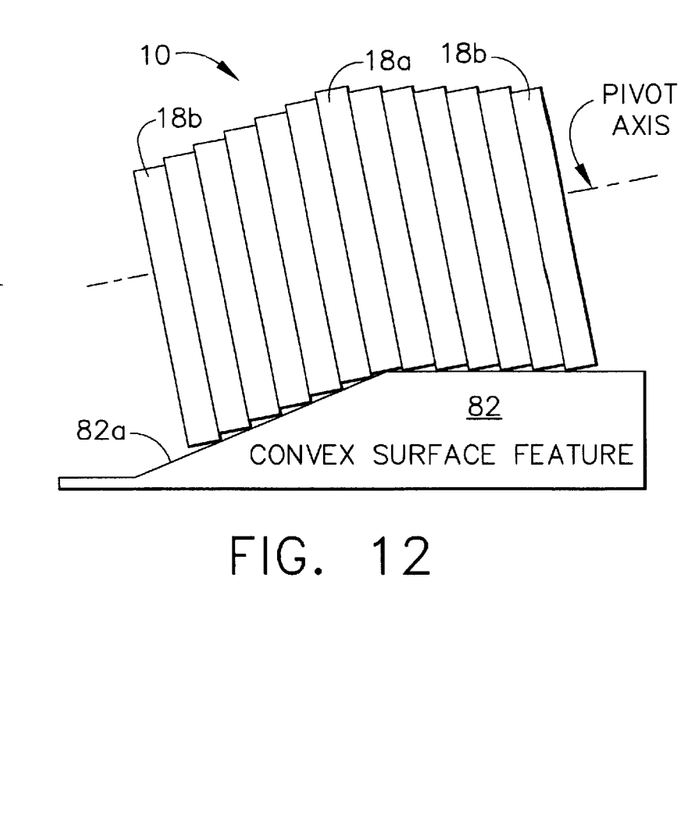
FIG. 12 is a view of the compaction roller of FIG. 4 conforming to a convex surface of a tool.

Referring to FIGS. 11 and 12, the compaction roller 10 of the present invention is shown conforming to different complexly shaped surfaces. In FIG. 11, the compaction roller 10 is shown conforming to a concave surface 80a of a tool 80 of a fiber placement machine. FIG. 12 illustrates the compaction roller 10 conforming to a convex surface 82a of a tool 82 mounted in a fiber placement machine. In both figures, it can be seen that the independent roller segments 18 are able to move independently of one another as needed to allow the roller 10 to conform to the tool surface 80 or 82.

Another important advantage of the roller 10 of the present invention is the increase in stroke length that should be achievable over compaction rollers having linearly translating segments. For any given diameter of roller, the pivoting movement of the roller segments 18 should provide a stroke length (i.e., overall distance of travel) increase over a conventional roller having linearly translating segments. This will allow the roller 10 of the present invention to conform to tool surfaces having surfaces of even greater contour and/or complexity.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A compaction roller for use with a fiber placement machine, the compaction roller comprising:

a plurality of roller segments disposed adjacent one another and supported by a pivot shaft in side-by-side fashion for independent movement about said pivot shaft each said roller segment further having a cutout;

said pivot shaft extending through each of said roller segments so as to be disposed within a perimeter of each said roller segment, said pivot shaft further being offset from a coaxial center of each said roller segment so as to be disposed eccentrically relative to each said roller segment;

a segment moving member disposed within said cutouts for urging said roller segments pivotally in an arcuate path about said eccentrically disposed pivot shaft to conform to a complexly shaped surface of a tool mounted within said fiber placement machine, to thereby enable said roller segments to apply a generally uniform pressure across said complexly shaped surface of said tool.

2. The compaction roller of claim 1, further comprising a strong back member disposed within said cutouts adjacent to said segment moving member, and being supported by portions of said fiber placement machine, to provide a stationary surface against which said segment moving member can be braced.

3. The compaction roller of claim 1, wherein each said roller segment comprises a bearing assembly disposed on a perimeter portion thereof.

4. The compaction roller of claim 1, wherein each said roller segment further comprises:

a bearing assembly disposed on an outer perimeter thereof; and a tire member supported by said bearing assembly;

said tire member being rotatable relative to its associated said roller segment.

5. The compaction roller of claim 1, wherein said cutouts comprise arcuate shaped cutouts which cooperatively form an arcuate shaped bore through said roller segments.

6. The compaction roller of claim 1, wherein said segment moving member comprises an expandable bladder.

7. The compaction roller of claim 1, wherein said segment moving member comprises a pair of expandable bladders.

8. A compaction roller for use with a fiber placement machine, the compaction roller comprising:

a plurality of roller segments disposed adjacent one another and supported by a pivot shaft in side-by-side fashion for movement about said pivot shaft, each said roller segment further having an arcuate shaped cutout centered about said pivot shaft;

said pivot shaft extending through each of said roller segments so as to be disposed within a perimeter of each said roller segment, said pivot shaft further being offset from a coaxial center of each said roller segment so as to be disposed eccentrically relative to each said roller segment;

each said roller segment including a bearing assembly disposed on an outer perimeter thereof and a tire portion supported on said bearing assembly, to thereby enable said tire portion to rotate relative to said roller segment;

a strong back member having a length sufficient to extend through each of said roller segments and disposed within the arcuate shaped cutouts to limit fore and aft eccentric pivoting movement of each said roller segment, said strong back member being supported by a portion of said fiber placement machine; and a segment moving member disposed within said arcuate shaped cutouts and against said strong back member for urging each of said roller segments pivotally about said pivot shaft in an arcuate path extending in a first direction, while allowing said roller segments to pivot along an arcuate path in a second direction generally opposite to said first direction upon experiencing a reaction force which exceeds the force being applied to that specific said roller segment by said segment moving member, thereby enabling said roller segments to independently pivot eccentrically about said pivot shaft as needed as said tire members roll over a complexly shaped, non-linear tool surface mounted in said fiber placement machine.

9. The compaction roller of claim 8, wherein said segment moving member comprises at least one expandable bladder.

10. The compaction roller of claim 8, wherein said tire portion comprises an elastomeric tire member.

11. The compaction roller of claim 8, wherein at least one of said roller segments is fixed for non-movement relative to said pivot shaft.

12. The compaction roller of claim 8, further comprising a pair of end plates disposed on opposite ends of said strong back member to thereby retain said roller segments in said side-by-side relationship.

13. The compaction roller of claim 8 wherein a central one of said roller segments is fixed for non-movement relative to said pivot shaft; and wherein said segment moving member comprises a pair of expandable bladders disposed on opposite sides of said central one of said roller segments.

* * * * *